Patented Oct. 12, 1954

2,691,675

UNITED STATES PATENT OFFICE 2,691,675

PROCESS FOR PREPARING NEOMYCIN A

Robert L. Peck, Plainfield, N. J., Charles E. Hoffhine, Jr., Waukegan, Ill., and Karl Folkers, Plainfield, N. J., assignors to Merck & Co., Inc., Rahway, N. J., a corporation of New Jersey No Drawing. Application February 27, 1951, Serial No. 213,052

10 Claims. (Cl. 260—563)

This invention is concerned generally with new processes for producing the antibiotic substance neomycin A. More particularly, this invention relates to processes for converting combined forms of neomycin A, present in S. fradiae fermentation broths or concentrates thereof such as "neomycin complex," or in pure form such as neomycin B, to neomycin A.

The term "neomycin complex" has been suggested by Swart et al. in Arch. Biochem. 24, 92 (1949) as the name for the crude concentrate, containing a mixture of various active substances, obtained from S. fradiae fermentation broths. A full description of the method for preparing both the neomycin complex as well as the S. fradiae fermentation broth is given in Science 109, 303 (1949) and the above-mentioned publication.

Neomycin A (J. Am. Chem. Soc. 71, 2590 (1949)) and neomycin B (J. Am. Chem. Soc. 72, 1045 (1950)), two of the active entities found in neomycin complex, have been isolated in pure form. In a co-pending application of one of us (U. S. Serial No. 101,908, filed June 28, 1949, now abandoned), neomycin A, and processes for its separation and purification, are further described. That neomycin complex appears to consist mainly of neomycins A and B, together with small amounts of other neomycin types, is also shown in this co-pending application.

Neomycin A hydrochloride is a white amorphous powder $[\alpha]_D^{25°\ C.}$=about $+83°$ (C, 1.0 in water), shows a positive ninhydrin test for amino groups, a negative Elson-Morgan glucosamine test, a negative maltol test, and a negative Sakaguchi test for guanido groups. It begins to darken at about 220° C. and melts with decomposition at about 250–260° C. The activity of neomycin A hydrochloride is about 1700 neomycin units per milligram in the cup-assay when the test organism is a strain of B. subtilis; [all assays herein reported were made by the agar diffusion or cup method essentially as shown in Arch. Biochem. 24, 92 (1949)].

Neomycin B sulfate is a homogeneous single compound and assays about 215 neomycin units per milligram against a strain of B. subtilis. By paper chromatography, it has been shown that the neomycin B sulfate $[\alpha]_D^{25°\ C.}$=about $+58°$ (C, 0.5 in water) is a single active substance. Neomycin B, in contrast to neomycin A, gives a positive Elson-Morgan glucosamine test.

In the co-pending application Serial No. 101,908, previously referred to, aqueous-organic countercurrent distribution studies show that neomycin A is more soluble in organic solvents than is neomycin B, while neomycin B is more soluble in water than is neomycin A. Thus these active neomycin molecules can be characterized by their partition coefficients in a suitable aqueous-organic solvent system.

Neomycin A and neomycin B are both efficacious against tuberculosis in the test tube and in vivo. However, neomycin A is considerably more active than neomycin B against certain organisms such as B. subtilis.

Neomycin A is considerably less toxic than neomycin B and neomycin complex. Therefore it may be used preferentially in many cases where neomycin B would be too toxic.

We have now discovered a process for producing neomycin A in good yields from crude mixtures, such as the crude fermentation broths, or concentrates thereof like neomycin complex, obtained by growing cultures of Streptomyces fradiae in suitable nutrient culture media, the antibiotic activity of which is largely due to combined forms of neomycin A. We have further discovered that the process can be used for the production of neomycin A starting with combined forms of neomycin A isolated in the pure state such as neomycin B.

Our novel process comprises treating a combined form of neomycin A with acids, thereby converting said combined form of neomycin A to neomycin A. It is ordinarily preferred to utilize a mineral acid, although suitable organic acids may be utilized, if desired. We have found that the treatment of the crude fermentation broth or concentrates thereof with acid, which results in hydrolysis of the combined forms of neomycin A to neomycin A, also results in the formation of a product of greatly enhanced antibiotic activity. This discovery is indeed surprising in view of the fact that no other crude antibiotic mixture, when so treated, has yielded increased activity.

Regarded in certain of its broader aspects, the novel features of the present invention comprises reaction of pure combined forms of neomycin A (such as neomycin B), or of neomycin broth or concentrates thereof containing neomycin A and/or combined forms thereof (such as neomycin complex), with a mineral or organic acid, neutralization of the excess acid, recovery of the neomycin A in substantially pure form preferably as the picrate salt, and the formation therefrom of pure mineral acid salts of neomycin A suitable for clinical application. Although the S. fradiae fermentation broth, or various concentrates thereof, may be treated with acid, thus converting combined forms of neomycin A to neomycin A, we prefer to hydrolyze the crude concentrate called neomycin complex.

The combined forms of neomycin may be hydrolyzed by any mineral or organic acids which yield sufficient hydrogen ion concentrations in aqueous solution to effect hydrolysis without reducing, oxidizing, or otherwise decomposing the neomycin molecule. Mineral acids, such as hydrochloric acid, sulfuric acid, phosphoric acid, and the like, which do not give rise to side reactions, such as oxidations, are ordinarily preferred for the acid treatment. Nitric acid, because of extensive decomposition encountered, is not considered satisfactory, although dilute solutions could probably be used. For purposes of economy and ease of removal, it is particularly preferred to utilize hydrochloric acid.

Acids from dilute to concentrated strength may be used to effect the hydrolysis but less time is required for the reaction when higher acid concentrations are used. Hydrochloric acid may be employed in strengths from 1 N to concentrated (ca. 12 N) with satisfactory results. If a 2.5 mineral acid is used for the reaction, from 5 to 20 days are required to complete the reaction at room temperature.

The treatment of neomycin broth or concentrates thereof, or pure combined forms of neomycin A, with aqueous mineral acid or organic acid is preferably conducted at the reflux temperature. Lower temperatures may be used but then a longer reaction time is required. Temperatures above the reflux temperature involve the danger of decomposition of neomycin A.

The time of heating is dependent upon the strength of the acid used. When concentrated hydrochloric acid is used, about one-half hour at reflux temperature is preferred. With 1 N hydrochloric acid, a period of about one and one-half hours at reflux temperature gives satisfactory results. Using 5 N hydrochloric acid, heating for about one hour at reflux temperature is preferred.

After completion of the reaction, an alkali metal hydroxide is added to neutralize the excess acid, preferably at a temperature of about 20–30° C., although an elevated temperature may be employed. The solution is brought to a pH of about 6–6.5. When neomycin A is separated and purified as neomycin A picrate, a more alkaline pH gives rise to the possibility of separation of an alkali metal picrate along with neomycin A picrate, so that a pH of 6–6.5 is preferred.

Neomycin A is conveniently recovered in pure form from the neutralized reaction mixture by forming said neomycin A picrate. Admixture with picric acid is carried out at a temperature near the boiling point of the solutions. Variations in the amount of picric acid are permissible, but a ratio of one and one-half or two to one (weight for weight) of picric acid and crude concentrate is preferred. The mixture is brought to boiling after addition of decolorizing carbon and is filtered at the boiling point. The separation of the neomycin A picrate in crystalline form is a somewhat critical step, being accomplished by vigorous agitation and seeding as the clear hot filtrate begins to cool. After crystallization has started, agitation may be only occasional. If this procedure is not followed, the picrate nearly always separates in amorphous condition. Recrystallization of the picrate to constant properties (constant melting point) is carried out in water as solvent. Other salts such as that of p-(p'-hydroxyphenylazo)-benzene-sulfonic acid may also be employed for preparation of pure material.

The following examples illustrate methods of carrying out the present invention, but it is to be understood that these examples are given by way of illustration and not of limitation.

EXAMPLE 1

Seventy grams of neomycin complex with activity of about 225 units/mg., was dissolved in 125 ml. of concentrated hydrochloric acid and mixed with 175 ml. of water. The solution was held at reflux temperature for one hour and then concentrated to about one-half volume under reduced pressure. The solution was neutralized to pH 6, warmed to about 70° C. and poured into a boiling solution of 105 g. of picric acid in 2100 ml. of water. Fifteen grams of activated charcoal (Darco G-60) was added, and the mixture was boiled for about 3 minutes and filtered by gravity through filter paper. The filtrate was cooled to 10° C., and the supernatant solution was decanted from the gummy picrate which had been deposited. The picrate was dissolved in about 300 ml. of acetone and poured with stirring into 3 l. of acetone containing 60 ml. of concentrated hydrochloric acid. A granular precipitate of neomycin A hydrochloride precipitated at once. The product was collected on a filter, washed with acetone, and dried; yield 29.4 g., activity about 2000 units/mg.

The total activity of the starting material was 15,700,000 units, that of the product about 59,000,000 units, when tested using B. subtilis as test organism.

All assays in this and the following examples were made by the agar diffusion or cup method as shown in Arch. Biochem. 24, 92 (1949), using a nutrient agar medium that had the following compositions; meat extract 0.15%, peptone 0.6%, yeast extract 0.3%, agar 1.5%, made to volume with distilled water. The assays were made at pH 8 using B. subtilis as test organism.

EXAMPLE 2

A 20 g. sample of neomycin complex was dissolved in 100 ml. of 5 N hydrochloric acid and held at reflux temperature. Aliquots of 25 ml. each were removed after one-half hour, one hour and two hour periods. After 6 hours the remaining 25 ml. was cooled. Each sample was cooled, neutralized to pH 6, warmed to about 70° C., poured into a boiling solution of 7.5 g. of picric acid in 150 ml. of water, mixed with 1.2 g. of activated charcoal (Darco G-60), and filtered at about the boiling point. The filtrates were cooled to 10° C., whereupon a gummy picrate separated. The mother liquors were decanted, and the gummy picrate fractions were each dissolved in 25 ml. of acetone and poured with stirring into 400 ml. of acetone containing 8 ml. of concentrated hydrochloric acid. The regenerated neomycin A hydrochloride precipitate was washed with acetone and dried. The weight of neomycin A hydrochloride recovered from each aliquot and its biological activity are tabulated hereinbelow:

| Time, Hours | Wt. of Product, g. | Activity of Product, Units/mg. | Total Activity, Units |
|---|---|---|---|
| 0.5 | 1.21 | 1,176 | 1,420,000 |
| 1.0 | 1.33 | 1,540 | 2,050,000 |
| 2.0 | 0.89 | 1,794 | 1,600,000 |
| 6.0 | 1.60 | 776 | 1,240,000 |
| Starting Material | 5.0 | 125 | 625,000 |

It is evident from the table that the desired result, namely, increase in potency and in total activity, can be obtained by heating from one-half to six hours with 5 N hydrochloric acid. Heating for a period longer than five to six hours, however, may be deleterious. A shorter period than one-half hour could probably be employed, but one-half to one hour is preferred.

EXAMPLE 3

One hundred grams of neomycin complex (121 units/mg.) as hydrochloride was dissolved in a mixture of 180 ml. of concentrated hydrochloric acid and 250 ml. of water. The solution was held at reflux temperature for one hour, then cooled to 20-30° C., and neutralized to pH 6 with external cooling. The solution was then warmed to 70° C. and poured into a boiling solution of 150 g. of picric acid in 3000 ml. of water. To this solution was added 30 g. of activated charcoal (Darco G-60), and the mixture was brought to boiling and filtered hot. The filtrate was seeded with crystalline neomycin A picrate and stirred vigorously while cooling. A crystalline precipitate formed fairly rapidly. After cooling to about 25° C., the crystalline neomycin A picrate was collected on a filter, then suspended in 1500 ml. of water. Solution was effected by heating the solution to near boiling. To the solution was added 7.5 g. of activated charcoal (Darco G-60) and the solution was brought to boiling and filtered hot. The filtrate was seeded and caused to crystallize as described above. The crystalline product was recrystallized again from 1200 ml. of water after treating the boiling solution with 8.0 g. of Darco G-60, and finally from 1000 ml. of water after treating the boiling solution with 6.0 g. of Darco G-60. The final crystalline product (M. P. 260-265° C.) was dissolved in about 400 ml. of acetone and poured with stirring into 3000 ml. of acetone containing 25 ml. of concentrated hydrochloric acid to give an amorphous, white precipitate of neomycin A hydrochloride; yield, 13.6 g., activity 1906 units/mg.

A corresponding preparation was regenerated in the same way using sulfuric acid instead of hydrochloric acid. The yield from 100 g. of the same starting material was 16.4 g. of neomycin A sulfate, activity 1400 units/mg.

Another preparation of neomycin A sulfate was prepared in the same way from repeatedly recrystallized neomycin A picrate to give a white, amorphous powder, $[\alpha]_D^{25°\ C.}=75.5°$ (C, 1.0 in water). *Analysis.*—Found: C, 27.96; H, 6.01.

EXAMPLE 4

A five-gram sample of neomycin complex was dissolved in 25 ml. of 5 N sulfuric acid and held at reflux temperature for one hour. The solution was cooled and neutralized with aqueous sodium hydroxide to a pH of about 6. The neutralized solution (volume now about 35 ml.) was warmed to about 70° C., and poured into a boiling solution of 7.5 g. of picric acid in 150 ml. of water. 1.1 g. of activated charcoal (Darco G-60) was added and the mixture was boiled for about two minutes and filtered by gravity. A gummy picrate separated on cooling the filtrate to about 10° C. The mother liquors were removed by decantation and the residual picrate was dissolved in about 25 ml. of acetone. The acetone solution was poured into 400 ml. of acetone containing 8 ml. of concentrated hydrochloric acid with stirring. An immediate precipitate of neomycin A hydrochloride separated. This was collected on a filter, washed with acetone and dried.

The same conditions were used on five-gram samples of the same starting material but substituting the following 5 N acids for the 5 N sulfuric acid: Phosphoric acid, acetic acid, and nitric acid. The weights and activities of the product obtained in all the experiments are compared with the starting material in the following table.

*Yields of neomycin A hydrochloride from 5-gram samples of crude neomycin complex with different acids*

| Acid | Wt. of Product, g. | Activity of Product, Units/mg. | Total Activity, Units |
|---|---|---|---|
| 5 N Sulfuric | 1.09 | 1,241 | 1,350,000 |
| 5 N Phosphoric | 0.90 | 1,187 | 1,070,000 |
| 5 N Acetic | 1.13 | 325 | 368,000 |
| 5 N Nitric—decomposition encountered | | | |
| Starting Material | 5.0 | 125 | 625,000 |

The assays were carried out on a side-by-side basis, so they may be considered comparable. Acetic acid gives a slight effect; nitric acid at the strength employed resulted in such extensive decomposition that it was not possible to recover significant amounts of activity. Sulfuric and phosphoric acids gave typical improvements in product and increase in total activity. At lower concentrations, nitric acid could probably be used, but would not be very desirable owing to the possible side reactions which might be encountered.

EXAMPLE 5

One-hundred fifty milligrams of neomycin B sulfate (150 units/mg. vs. *B. subtilis*) was dissolved in 15 ml. of 2.5 N hydrochloric acid and allowed to stand at room temperature for 16 days. At the end of this time an aliquot was taken, neutralized to pH 7 and compared biologically with pure samples of neomycin A and neomycin B. The results are shown in the accompanying table.

*Comparative assay data*

| Sample | Activity observed in units/mg. of the neomycin salt using *B. subtilis* as test organism | Activity in terms of γ/ml. required to inhibit— | |
|---|---|---|---|
| | | *M. lysodeikticus* | *K. pneumoniae* |
| Pure neomycin A | 1,700 | 10 | 17 |
| Pure neomycin B | 150 | 3 | 5 |
| Neomycin B after hydrolysis | 1,700 | 11 | 25 |

The results show clearly that the properties of acid-treated neomycin B correspond to those of neomycin A rather than to those of neomycin B.

The remainder of the solution of acid-treated neomycin B was neutralized to pH 7 and mixed with a solution of sodium p-(p'-hydroxyphenylazo)-benzene sulfonate to give a crystalline product. The crystals were the corresponding salt of neomycin A contaminated with some inorganic salt.

From a 108 mg. sample of neomycin B, acid-treated in the same way, followed by neutralization and addition of picric acid, there was obtained a crystalline neomycin A picrate weighing 98 mg. After three recrystallizations from hot water, the purified neomycin A picrate weighed 34 mg. and decomposed at about 255° C. with previous softening.

Various changes and modifications may be made in carrying out the present invention without departing from the spirit and scope thereof. Insofar as these changes and modifications are within the purview of the annexed claims, they are to be considered as part of our invention.

We claim:

1. The process which comprises bringing neomycin B into intimate contact with an aqueous solution of a mineral acid selected from the group consisting of hydrohalic, sulfuric and phosphoric acids, and having a normality between about 1 N and 12 N, thereby converting said neomycin B to neomycin A.

2. The process which comprises bringing together neomycin B and an aqueous solution of a mineral acid selected from the group consisting of hydrohalic, sulfuric and phosphoric acids, and having a normality between about 1 N and 12 N, and heating the resulting solution at reflux temperature for a period of approximately 0.5 to 6 hours, thereby converting said neomycin B to neomycin A.

3. The process which comprises bringing together neomycin B and an aqueous solution of hydrochloric acid having a normality between about 1 N and 12 N, and maintaining the resulting solution at a temperature within the range from room temperature to reflux temperature for a period of time in excess of approximately one-half hour, thereby converting said neomycin B to neomycin A.

4. The process which comprises bringing together neomycin B and an aqueous solution of sulfuric acid having a normality between about 1 N and 12 N, and maintaining the resulting solution at a temperature within the range from room temperature to reflux temperature for a period of time in excess of approximately one-half hour, thereby converting said neomycin B to neomycin A.

5. The process which comprises bringing together neomycin B and an aqueous solution of phosphoric acid having a normality between about 1 N and 12 N, and maintaining the resulting solution at a temperature within the range from room temperature to reflux temperature for a period of time in excess of approximately one-half hour, thereby converting said neomycin B to neomycin A.

6. The process which comprises bringing together neomycin B and an aqueous solution of hydrochloric acid having a normality of approximately 5, and heating the resulting solution at reflux temperature for a period of approximately 0.5 to 6 hours, thereby converting said neomycin B to neomycin A.

7. The process which comprises bringing neomycin complex containing neomycin B into intimate contact with an aqueous solution of a mineral acid selected from the group consisting of hydrohalic, sulfuric and phosphoric acids, and having a normality between about 1 N and 12 N, thereby converting said neomycin B to neomycin A.

8. The process which comprises heating together, under reflux, for a period of about 0.5 to 6 hours, an *S. fradiae* fermentation broth containing neomycin B and an aqueous solution of hydrochloric acid having a normality of approximately 5, thereby converting said neomycin B to neomycin A.

9. The process which comprises heating together, under reflux, for a period of about 0.5 to 6 hours, an *S. fradiae* fermentation broth concentrate containing neomycin B and an aqueous solution of hydrochloric acid having a normality of approximately 5, thereby converting said neomycin B to neomycin A.

10. The process which comprises bringing together neomycin B and an aqueous solution of hydrochloric acid having a normality of approximately 2.5, and maintaining the resulting solution at room temperature for a period of approximately 5 to 20 days, thereby converting said neomycin B to neomycin A.

References Cited in the file of this patent

Waksman et al.: Science, March 25, 1949, vol. 109, pp. 305–7.

Swart et al.: Arch. Biochem., November 1949, vol. 24, pp. 92–103.

Peck et al.: J. Am. Chem. Soc., July 1949, vol. 71, pp. 2590–91.

Regna et al.: J. Am. Chem. Soc., February 1949, vol. 72, pp. 1045–6.

O'Keefe et al.: J. Am. Chem. Soc., July 1949, vol. 71, pp. 2452-6.